(12) United States Patent
Choi

(10) Patent No.: US 6,349,011 B1
(45) Date of Patent: Feb. 19, 2002

(54) AUTOMATIC TRACKING SYSTEM AND TRACKING METHOD

(75) Inventor: Man-chul Choi, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/141,577

(22) Filed: Aug. 28, 1998

(30) Foreign Application Priority Data

Aug. 30, 1997 (KR) ............................................ 97-43539

(51) Int. Cl.[7] .............................................. G11B 5/584
(52) U.S. Cl. .................................................... 360/77.13
(58) Field of Search .............................. 360/77.13, 70, 360/75, 77.14, 77.15, 77.16

(56) References Cited

U.S. PATENT DOCUMENTS

| | | | | |
|---|---|---|---|---|
| 4,520,410 A | * | 5/1985 | Sekiguchi et al. | 360/77.13 |
| 4,688,109 A | * | 8/1987 | Sangu | 360/77.16 X |
| 5,241,434 A | * | 8/1993 | Okamoto et al. | 360/77.16 X |
| 5,771,132 A | * | 6/1998 | Hirohata et al. | 360/77.13 |

FOREIGN PATENT DOCUMENTS

| | | | |
|---|---|---|---|
| JP | 3-113769 | * | 5/1991 |
| JP | 3-137850 | * | 6/1991 |

* cited by examiner

*Primary Examiner*—David Hudspeth
*Assistant Examiner*—James L Habermehl

(57) ABSTRACT

An automatic tracking system includes an analog/digital converter for converting an envelope signal detected by scanning a track during reproduction into a digitized envelope signal; a first track center detecting part for processing the entire track as a block and determining a track center value for the track using the digitized envelope signal; a part track center detecting part for dividing the track into a plurality of minute blocks, summing digital data of the digitized envelope signal corresponding to each of the minute blocks to produce sum data for each minute block, and determining a track center value for each minute block using the sum data for each minute block; and a final track center detecting part for determining a new track center value by using the track center values output from the first track center detecting circuit and the part track center detecting part.

34 Claims, 11 Drawing Sheets recording track head trace head trace on track head output area not restorable restorable minimum signal level

H/SW

A/D Clk

Summing Area

Block head trace recording track proposed head trace on trace conventional head output area NOT restorable restorable minimum signal level proposed head output restorable minimum signal level weighted value
examples

AUTOMATIC TRACKING SYSTEM AND TRACKING METHOD

BACKGROUND OF THE INVENTION

1. Field of the Invention

The present invention relates to a magnetic recording reproducing apparatus, and more particularly, relates to a tracking system which performs automatic tracking by dividing one track into a plurality of minute blocks, and an automatic tracking method.

2. Discussion of Related Art

A video cassette recorder (VCR) is an apparatus recording video signals on magnetic tape, and has a deck part connected to an electrical part. The standard of the tape and the standard of the recorded signals are strictly provided for compatibility between different VCRs. Especially, the standard of the track linearity is used for the compatibility of VCRs. The width of track for high density recording becomes gradually narrow and determining the optimum tracking point is very important. Thus, as a tape is inserted into a deck, the VCR performs automatic tracking. The user may select either manual or autocontrol, as desired. The autocontrol uses the envelope of a regenerative signal. That is, according to the automatic tracking, the optimum tracking point is automatically determined and maintained as the tape is inserted into the VCR.

The overall flowchart of the automatic tracking is shown in FIG. 1.

As the tape is input to the VCR (Step 101), it goes to a regenerating state (Step 102), and offsetting of the VCR head is performed (Step 103). The output RF signal is filtrated to digitalize the envelope signal (Step 104. The tracking is controlled with a digital value converted in the Step 104, thus finding a tracking value (Step 105). If the tracking value obtained in the Step 105 is not a proper value, it goes to the Step 103 and performs the above procedure. If the proper tracking value is obtained in the Step 105 (Step 106), the track offsetting stops and the tracking value obtained in the Step 105 is maintained.

FIG. 2 is a block diagram of the automatic tracking system using such an envelope. A signal processing part 27 produces a synchronous signal (or Vref) by using input data and applies it to a servo part (26), and servo part 26 rotates a drum and a capstan motor. The data applied to signal processing part 27 is converted to be suitable for tape recording, and is provided to the head through a recording amplifier 23 thereby being recorded on the track of the tape. The drum servo of servo part 26 controls a drum motor so that the drum motor's rotating phase is synchronized to the normally-recorded video signal's phase in the recording mode. A capstan servo controls the capstan motor to the number of the capstan motor's rotation, thereby maintaining the traveling speed of the tape constantly, and recording the signal on the tape by exact pitch. A control signal is recorded on the control track, and the location of the control signal is indicative of that of the recorded signal during reproduction. That is, since there is the standard of a distance between the location of the control signal and the video track, the rotating head traces the track on the basis of the control signal like when recording, and reproduces the recorded signal. One control signal is recorded with respect to two video tracks. Two video heads are attached to a rotating head drum, and two video heads are physically offset from each other (12) in opposite directions (azimuth scanning). A single control is made with respect to one rotating motion of the rotating drum so that a video track recorded by a channel-1 head is traced by the channel-1 head.

Accordingly, servo part 26 rotates the drum and the capstan motor in response to the synchronous signal (or Vref) during reproduction, and a signal produced from the head is amplified by amplifier 23 and is produced to signal processing part 27. Signal processing part 27 receives the amplified signal and restores the same to data, thus producing it to a monitor. The drum servo of servo part 26 controls the number of rotations of the drum motor constantly during reproduction to obtain a regenerative signal without time shaft variation. The capstan servo controls the capstan motor so that the video head exactly traces the track, thus obtaining a regenerative signal of a maximum level. Envelope detecting part 24 detects an envelope signal from the RF signal produced by amplifier 23, and tracking control part 25 digitalizes the envelope signal detected by envelope detecting part 24 to obtain tracking data, and transmits the data to servo part 26.

FIG. 3 is a detailed block diagram of tracking control part 25 of FIG. 2, and an analog/digital (A/D) converter 31 converts the envelope signal Env into a digital signal according to an A/D sampling clock, as shown in FIG. 4b. A summing part 32 sums the envelope signal, digitalized by A/D converter 31, in the unit of a head switching pulse H/SW, as shown in FIG. 4a. The sum area of summing part 32 indicates a single tracking section, a half period of the head switching pulse, as shown in FIG. 4c. Therefore, summing part 32 adds one to several A/D values to one track.

Storing part 33 stores the summed data in an address produced from a tracking controller 35, e.g. an address corresponding to a track offset value. Whenever tracking controller 35 changes a tracking value, e.g. an offset value, the value added by summing part 32 is stored in storing part 33. Storing part 33 stores sum data for each track, as shown in FIG. 5. The horizontal axis of FIG. 5 corresponds to values obtained by offsetting the head when reproducing the track, made during recording. FIG. 6 depicts a tracking offsetting method, and A and B and C correspond to zero and left in offsetting. Track center detecting part 34 obtains a center of the track by the use of data for each track stored in storing part 33. The center of the track may be obtained either by finding the form of a peak curve and obtaining its maximum value, or by obtaining a middle of a value more than a fixed value. Track center detecting part 34 obtains a track center value by the use of one of the above methods, and produces the track center data to tracking controller 35. Tracking controller 35 produces the tracking data to servo part 26, thus performing tracking.

As described above, according to the conventional automatic tracking method, the overall values A/D converted by tracks are summed to process it as one data, and the center of the track is obtained with an average of the overall values. There is no problem of finding the center of the overall signals of the track, and this method cannot cope with deterioration of the linearity of the track or a change in the track. As shown in FIG. 7a, the trace of the recording track in set A has a linearity problem in an upward direction, due to mechanical problems, worn-out tapes, etc., and the trace of the track in set B has a linearity problem in a downward direction, as shown in FIG. 7b. In this occasion, according to the conventional art, the trace of the head exactly overlaps the recording track, as shown in FIG. 7c. However, there are linearity problems as shown in FIGS. 7a and 7b, and an output of the head is depicted in FIG. 7d. If the dotted line of FIG. 7d is a restorable minimum signal level, the data cannot be restored under that level.

Since the narrower the width of the track is, the more the problem becomes serious, recording is made by shuffling data for correcting errors during recording digital data, and when a predetermined part of the track is not restored due to the difference of signal levels, the overall screen is broken.

SUMMARY OF THE INVENTION

Accordingly, the present invention is directed to an automatic tracking system and an automatic tracking method that substantially obviate one or more of the problems due to limitations and disadvantages of the related art.

An object of the present invention is to provide an automatic tracking system and an automatic tracking method whereby a track is processed as one block to find a one-track center value, and at the same time, the track is divided into a plurality of minute blocks to find a track center value by blocks, thus a finding a new track center value by using the one-track center value and track center values for the respective blocks.

Another object of the present invention is to provide an automatic tracking system and an automatic tracking method whereby a track is divided into a plurality of minute blocks to find a track center value for each block, thus obtaining a new track center value by using that center value.

Still another object of the present invention is to provide an automatic tracking system and an automatic tracking method whereby a track is divided into a plurality of minute blocks to find a track center value for each block, and a mean of the leftmost value and the rightmost value of track center values for the respective values is set as a new track center value.

Still another object of the present invention is to provide an automatic tracking system and an automatic tracking method whereby a track is divided into a plurality of minute blocks and sum data for each block is multiplied by a corresponding weighted value and added to find a new track center value.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention discloses an automatic tracking system including an analog/digital converter converting an envelope signal detected during reproduction into a digital signal; a first track center detecting circuit processing a track as a block, summing and storing data of the analog/digital converter by a head switching pulse, and finding a track center value; a part track center detecting circuit dividing a track into a plurality of minute blocks, summing and storing digital data corresponding to the minute blocks, distributed from the analog/digital converter, in each minute block, and finding a track center value for each minute block; a final track center detecting part finding a new track center value by using track center values output from the first track center detecting circuit and the part track center detecting circuit; and a tracking controller producing an address corresponding to a track offset value when storing sum data in the first track center detecting circuit and the part track detecting circuit, and receiving the track center value from the final track center detecting part and producing that value to a servo part for tracking.

According to another aspect of the present invention, an automatic tracking system includes an analog/digital converter converting an envelope signal detected during reproduction into a digital signal; a part track center detecting circuit dividing a track into a plurality of minute blocks, summing and storing digital data corresponding to the minute blocks, distributed from the analog/digital converter, in each minute block, and finding a track center value for each minute block; a final track center detecting part finding a new track center value by using track center values output from the part track center detecting circuit; and a tracking controller producing an address corresponding to a track offset value when storing sum data in the part track center detecting circuit, and receiving the track center value from the final track center detecting part and producing that value to a servo part for tracking.

According to still another aspect of the present invention, an automatic tracking system includes an analog/digital converter converting an envelope signal detected during reproduction into a digital signal; a part track center detecting circuit dividing a track into a plurality of minute blocks, summing and storing digital data each corresponding to the minute blocks, distributed from the analog/digital converter, in each minute block, and finding a track center value for each minute block; a final track center detecting part determining a new track center value as a mean of the leftmost value and the rightmost value of track center values produced from a plurality of blocks of the part track center detecting circuit; and a tracking controller producing an address corresponding to a track offset value when storing sum data in the part track center detecting circuit, and receiving the final track center value from the final track center detecting part and producing that value to a servo part for tracking.

According to still another aspect of the present invention, an automatic tracking system includes an analog/digital converter converting an envelope signal detected during reproduction into a digital signal; a summing controller dividing a track into a plurality of minute blocks, and distributing digital data of the analog/digital converter to each minute block; a plurality of summing means summing digital data distributed by the summing controller; weighted value means multiplying sum data $S_1$ to $S_n$, produced from a plurality of that summing means, by respective weighted values $a_1$ to $a_n$ and adding $$\left(\sum_{k=1}^{n} a_n \times S_n\right);$$

storing means storing sum data produced from the weighted value means; track center detecting means finding a track center value by the use of data stored in the storing means; and a tracking controller producing an address corresponding to a track offset value to the storing means when storing sum data, and receiving the final track center value from the track center detecting means and producing that value to a servo part for tracking.

According to still another aspect of the present invention, a method of performing automatic tracking by converting an envelope signal, detected during reproduction, into a digital signal, includes a first step of summing and storing the envelope signal by a head switching pulse by processing a track as one block, and finding a track center value; a second step of dividing the track into a plurality of minute blocks, summing and storing the digital envelope signal corresponding to each block in each block, and finding a track center value for each minute block; a third step of finding a new track center value by using track center values output in the first and second steps; and a fourth step of producing an address corresponding to a track offset value when storing sum data in the first and second steps, and receiving the final track center value from the third step for tracking.

According to still another aspect of the present invention, a method of performing automatic tracking by converting an envelope signal, detected during reproduction, into a digital signal, includes a first step of dividing the track into a plurality of minute blocks, summing and storing the digital envelope signal corresponding to each block in each block, and finding a track center value for each minute block; a second step of finding a new track center value by using track center values output in the first step; and a third step of producing an address corresponding to a track offset value when storing sum data in the first step, and receiving a final track center value from the second step for tracking.

According to still another aspect of the present invention, a method of performing automatic tracking by converting an envelope signal, detected during reproduction, into a digital signal, includes a first step of dividing the track into a plurality of minute blocks, summing and storing the digital envelope signal corresponding to each block in each block, and finding a track center value for each minute block; a second step of setting as a new track center value a mean of the leftmost value and rightmost value of track center values output from a plurality of the blocks in the first step; and a third step of producing an address corresponding to a track offset value when storing sum data in the first step, and receiving a final track center value from the second step for tracking.

According to still another aspect of the present invention, a method of performing automatic tracking by converting an envelope signal, detected during reproduction, into a digital signal, includes a first step of dividing a track into a plurality of minute blocks, and distributing the digital envelope signal, corresponding to each minute block, to each minute block; a second step of summing the digital envelope signal applied from the first step by the blocks; a third step of multiplying sum data $S_1$ to $S_n$, produced from a plurality of that summing means, by respective weighted values $a_1$ to $a_n$ and adding $$\left(\sum_{k=1}^{n} a_n \times S_n\right);$$

a fourth step of storing sum data produced from the third step; a fifth step of finding a track center value by the use of data stored in the storing means; and a sixth step of producing an address corresponding to a track offset value when storing sum data in fourth step, and receiving the track center value from the fourth step and controlling the tracking.

It is to be understood that both the foregoing general description and the following detailed description are exemplary and explanatory and are intended to provide further explanation of the invention as claimed.

(Option: In another aspect, the present invention provides . . . )

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF PREFERRED EMBODIMENT

Reference will now be made in detail to the preferred embodiments of the present invention, examples of which are illustrated in the accompanying drawings.

Figure 8:
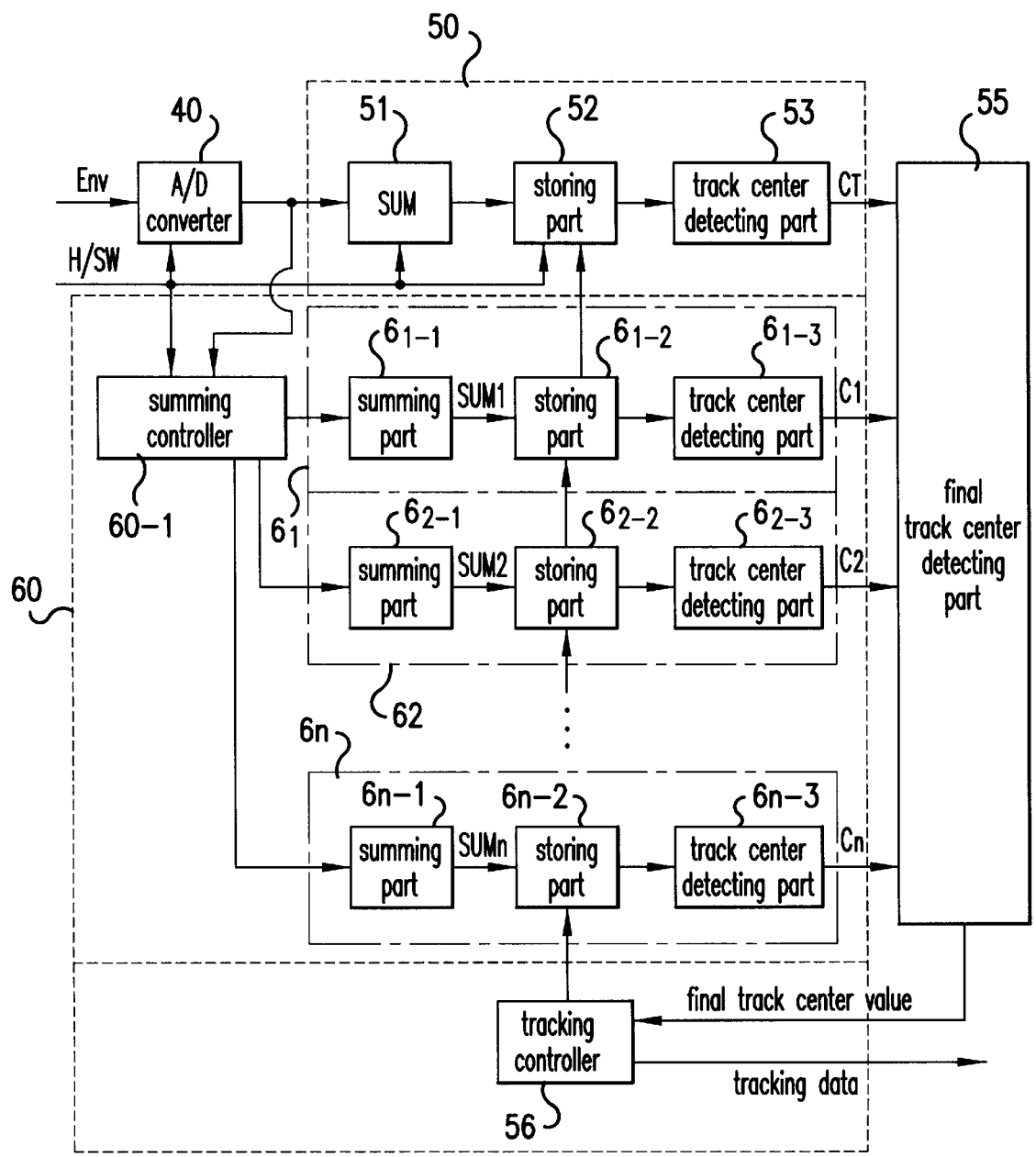
FIG. 8 is a block diagram of an automatic tracking system in accordance with a first preferred embodiment of the present invention.

FIG. 8 is a block diagram of an automatic tracking system in accordance with a first preferred embodiment of the present invention. A track is processed as a single block to find one track center. At the same time, the track is divided into n minute blocks, and a track center value is obtained by blocks. A new track center value is obtained by the use of the track center value for each block and one track center, thus performing tracking. In addition, the tracking may be performed by using a mean of the leftmost one and the rightmost one of the track center values for the respective blocks as a new track center.

Referring to FIG. 8, the automatic tracking system includes an analog/digital converter 40 digitalizing an envelope signal detected during reproduction; a first track center detecting circuit 50 processing a track as a single block to find one track center $C_T$; a part track center detecting circuit 60 dividing one track into n minute blocks and finding track centers $C_1$ to $C_n$ with respect to the n minute blocks; a final track center detecting part 55 finding a new track center value by using track center values produced from first track center detecting circuit 50 and part track center detecting circuit 60; a tracking controller 60 producing an address corresponding to a track offset value from first track center detecting circuit 50 and part track detecting circuit 60 when storing sum data, and producing the track center value from final track center detecting part 55 for tracking to a servo part 26.

Part track center detecting circuit 60 has a summing controller 60-1 which divides a track into n minute blocks $6_1$ to $6_n$ and receives A/D data corresponding to the blocks from A/D converter 40 and provides the same to each block $6_1$ to $6_n$. Each one of n blocks $6_1$ to $6_n$ includes a summing part, a storing part, and a track center detecting part.

A great part of the circuit of FIG. 8 may be commonly used and realized in software.

Figure 9A:
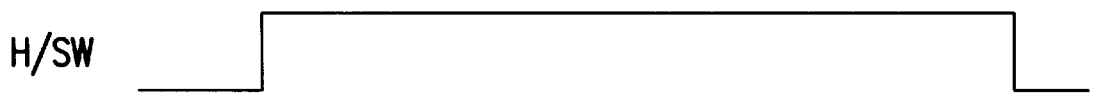
FIG. 9a is a timing diagram of a head switching pulse of FIG. 8.
Figure 9B:
FIG. 9b is a timing diagram of an A/D clock of an A/D converter of FIG. 8.

A/D converter 40 in the first preferred embodiment of the present invention samples and digitalizes an envelope signal with an A/D clock as shown in FIG. 9b. The envelope signal detects a regenerative RF signal, and when an area that the head traverses corresponds to the track, the envelope signal is the largest.

Figure 9C:
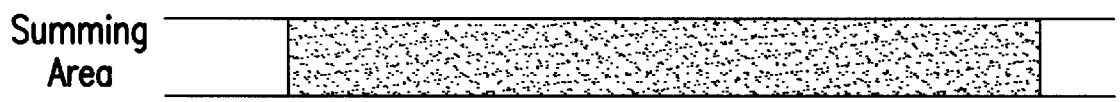
FIG. 9c is a timing diagram depicting a summing area of FIG. 8.
Figure 9D:
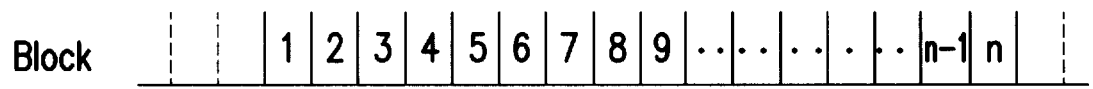
FIG. 9d is a timing diagram dividing a track of FIG. 8 into n blocks.

In first track center detecting circuit 50, like the conventional art, a summing part 51 sums the digitalized envelope signal by the head switching pulse, as shown in FIG. 9a, and storing part 52 stores data output from summing part 51 in an address produced from a tracking controller 56, e.g. an address corresponding to the track offset value. A summing area of summing part 51 is a half-periodic section of head switching pulse H/SW, as shown in FIG. 9c, and represents one track section. Track center detecting part 53 finds track center value $C_T$ by the use of data for each track stored in storing part 52 and produces it to final track center detecting part 55.

Figure 1:
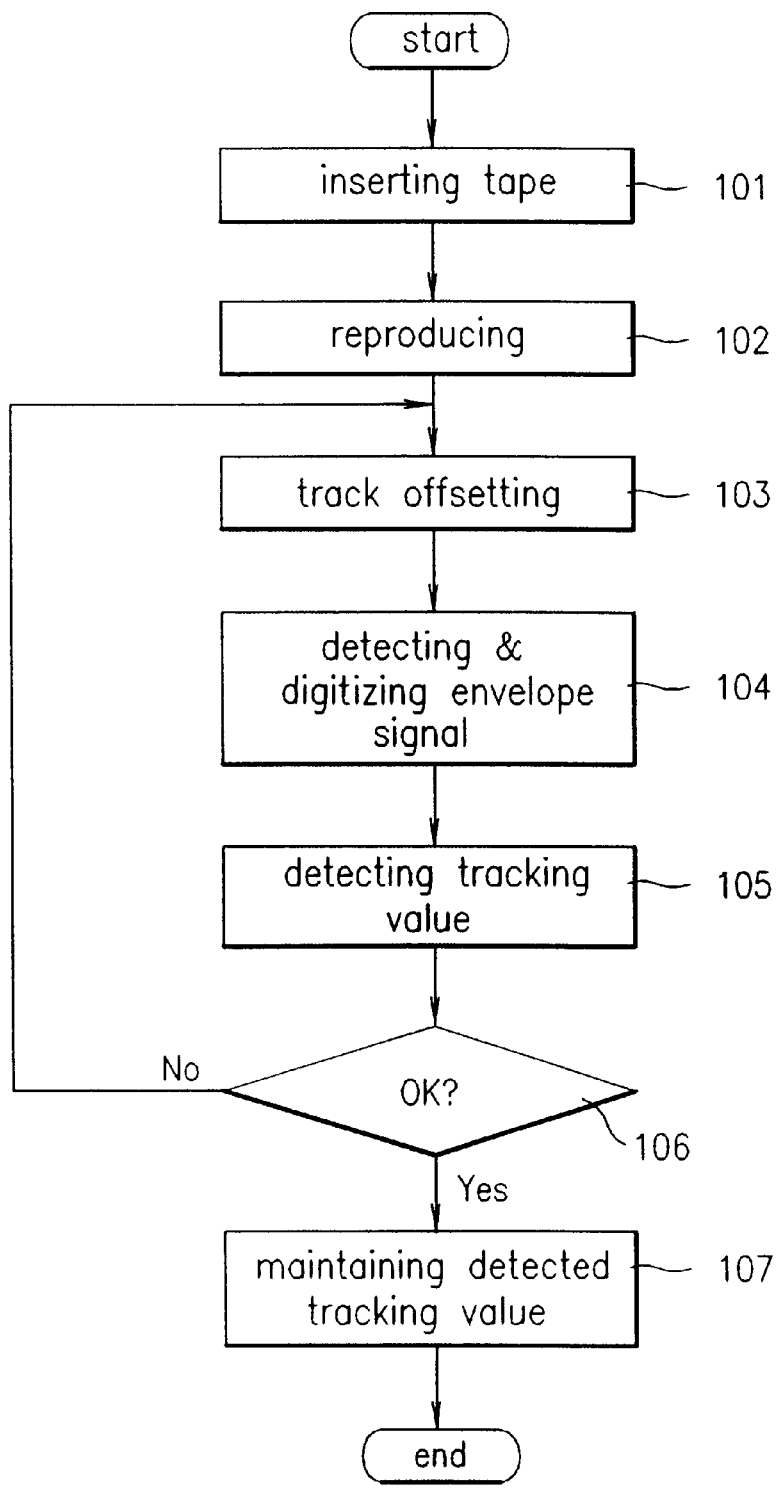
FIG. 1 is a flow chart of the automatic tracking of a conventional video cassette recorder.
Figure 2:
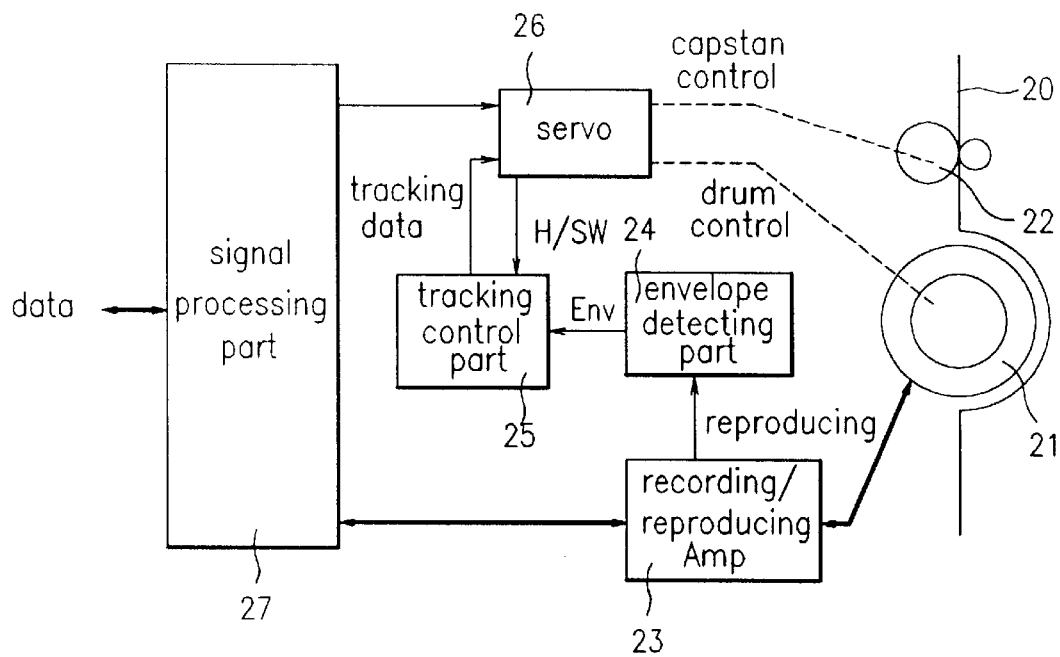
FIG. 2 is a block diagram of a conventional automatic tracking system.
Figure 3:
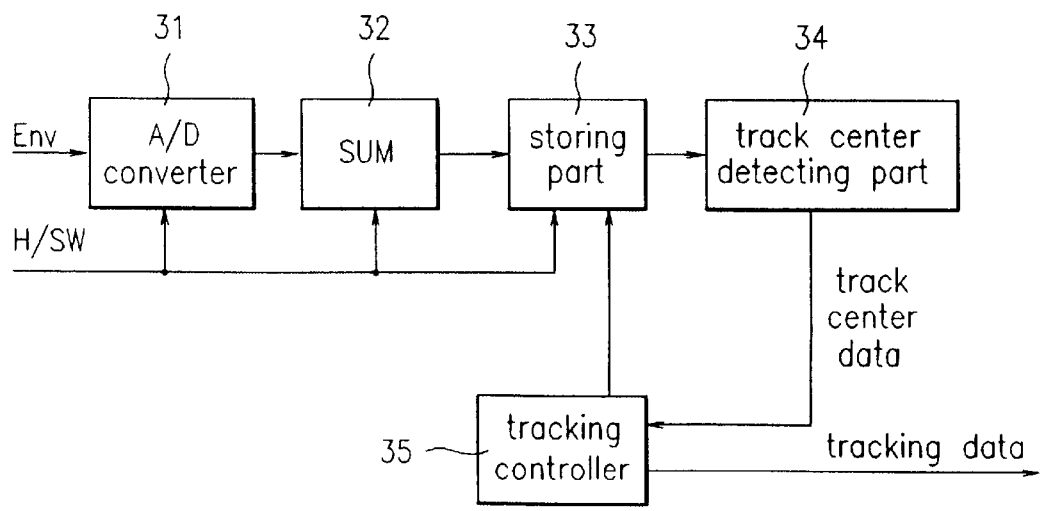
FIG. 3 is a detailed block diagram of a tracking control part of FIG. 2.
Figure 4A:
FIG. 4a is a timing diagram of a head switching pulse of FIG. 2.
Figure 4B:
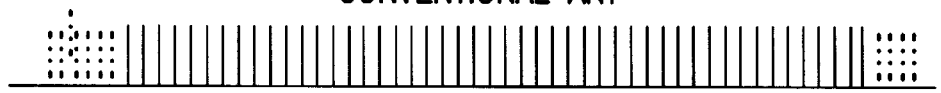
FIG. 4b is a timing diagram of an A/D clock of an A/D converter of FIG. 2.
Figure 4C:
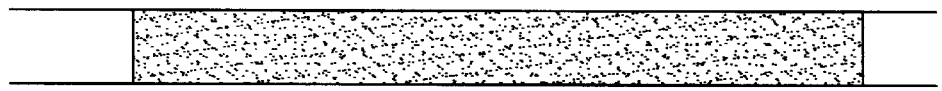
FIG. 4c is a timing diagram depicting a summing area of FIG. 2.
Figure 5:
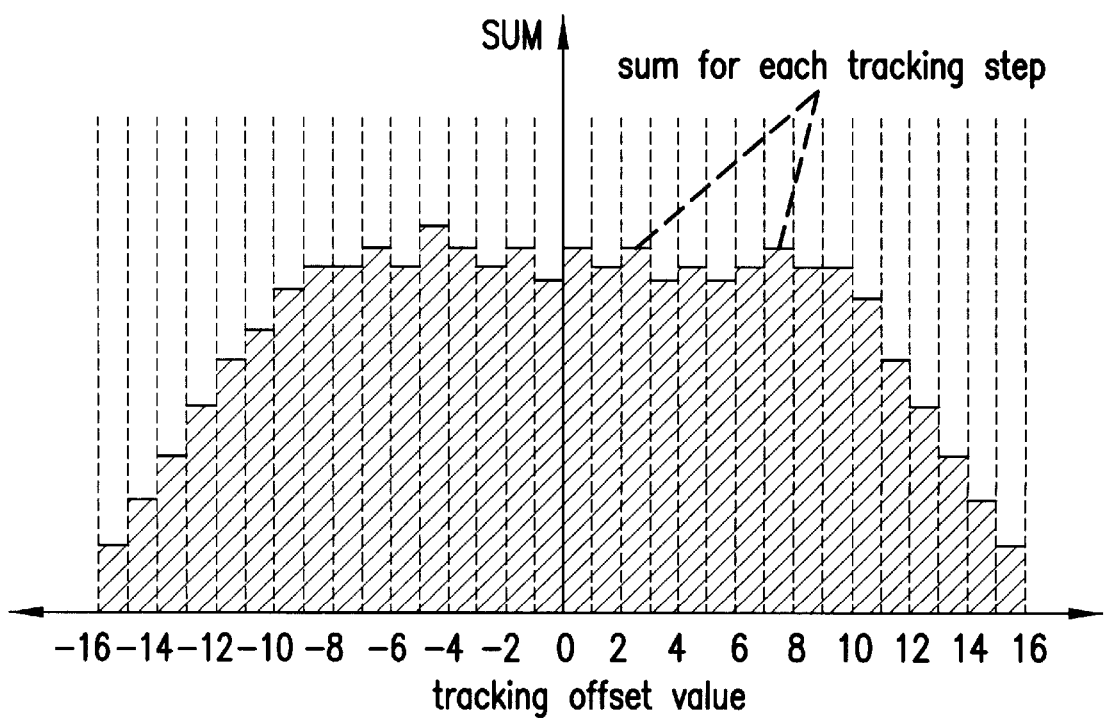
FIG. 5 is a timing diagram showing an example of sum data stored in a storing part of FIG. 2.
Figure 6:
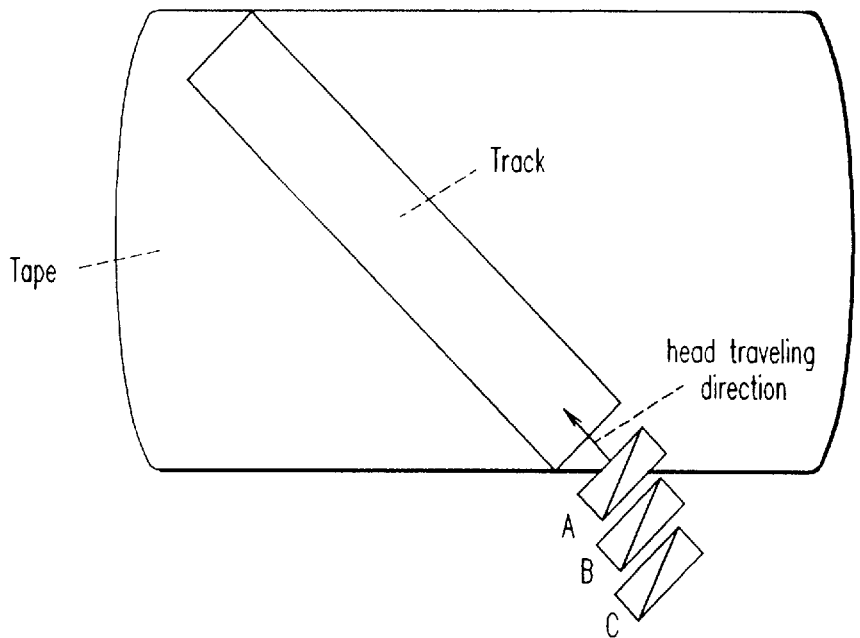
FIG. 6 is a sectional view showing a head offsetting.
Figure 7A:
FIGS. 7a to 7d are errors caused by a conventional tracking method.
Figure 7B:
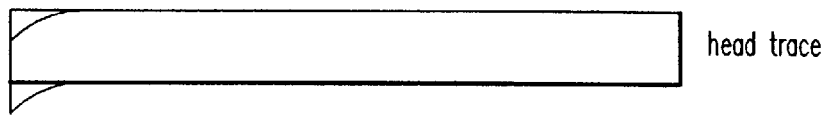
Figure 7C:
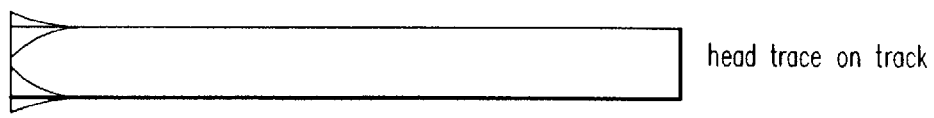
Figure 7D:
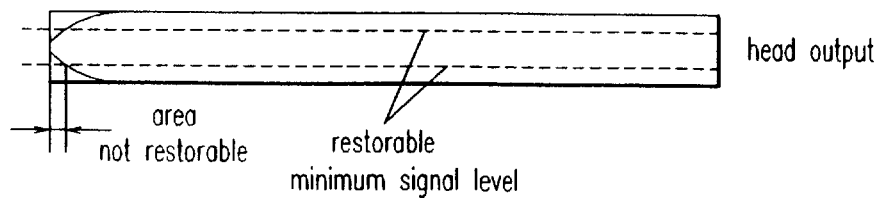

Summing controller 60-1 of part track center detecting circuit 60 divides one track into n minute blocks $6_1$ to $6_n$ by head switching pulse H/SW, and distributes digital data of A/D converter 40 for each block to each summing portion $6_{1-1}$ to $6_{n-1}$ of n blocks $6_1$ to $6_n$. Each storing portion $6_{1-2}$ to $6_{n-2}$ stores sum data SUM1 to SUMn of each summing portion $6_{1-1}$ to $6_{n-1}$, and each track center detecting part $6_{1-3}$ to $6_{n-1}$ of n blocks $6_1$ to $6_n$ finds track center values $C_1$ to $C_n$ by blocks by using sum data each stored in n storing portion $6_{1-2}$ to $6_{n-2}$ and produces the same to final track center detecting part 55. The sum of one track is the same in each block, as shown in FIG. 5.

Final track center detecting part 55 receives first track center detecting circuit 50' is one track center value $C_T$ and part track center detecting circuit 60's n track center values $C_1$ to $C_n$ to find a new track center value and produce the same to tracking controller 56. Tracking controller 56 produces the finally obtained track center value to servo part 26, thus performing tracking.

There are three methods of finding a new track center value by final track center detecting part 55.

Figure 10:
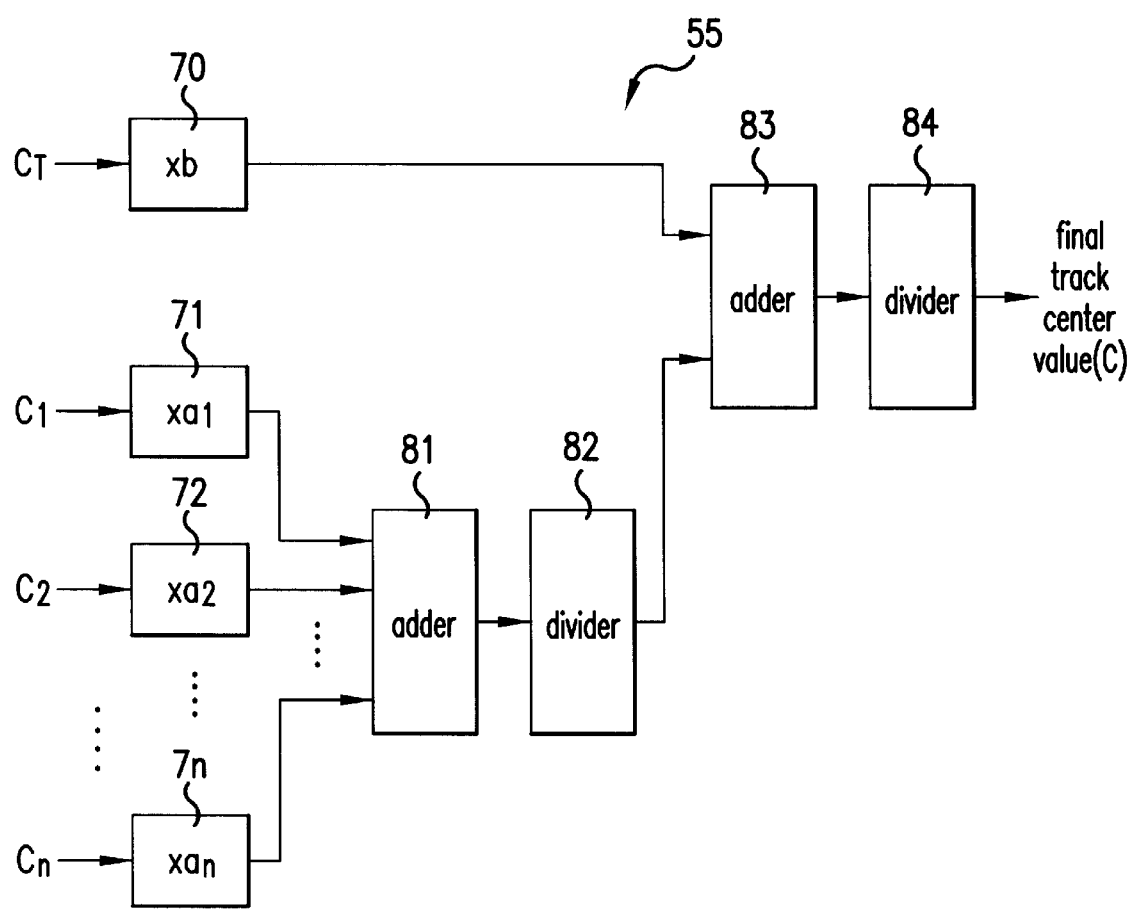
FIG. 10 is a detailed block diagram of a final track center detecting part of FIG. 8.

(1) n multipliers $7_1$ to $7_n$ multiplies n track center values $C_1$ to $C_n$, produced from part track center detecting circuit 60, by each weighted value $a_1$ to $a_n$, as shown in FIG. 10. An adder 81 adds all the results $$\sum_{k=1}^{n} a_n \times c_n$$

of n multipliers $7_1$ to $7_n$, and a divider 82 divides a result $$\sum_{k=1}^{n} a_n \times c_n$$

of adder 81 by a value $$\sum_{k=1}^{n} a_n$$

to which each weighted value is added $$\left( \frac{\sum_{k=1}^{n} a_n \times c_n}{\sum_{k=1}^{n} a_n} \right)$$

and normalizes it. The value $$\sum_{k=1}^{n} a_n$$

divided by divider 82 is set as a constant not zero.

Each weighted value $a_1$ to $a_n$, multiplied to track center values $C_1$ to $C_n$, varies with a block in which much weight is given. That is, the linearity may deteriorate at the first part and last part of the track, and the linearity can be more accurately corrected by multiplying track center values of blocks, each corresponding to the first and last parts of the track rather than the middle part, by weighted values larger than the track center values.

At the same time, multiplier 70 multiplies track center value $C_T$, produced from first track center detecting circuit 50, by a given constant, i.e. weighted value b ($b \times C_T$), and produces it to adder 83. Adder 83 adds the same to output $$\left( \frac{\sum_{k=1}^{n} a_n \times c_n}{\sum_{k=1}^{n} a_n} \right)$$

of divider 82

$$\left( bC_T + \frac{\sum_{k=1}^{n} a_n \times c_n}{\sum_{k=1}^{n} a_n} \right).$$

Weighted value b multiplied to one track center value $C_T$ depends on giving much weight in one-track center value or track center values $C_1$ to $C_n$ for correcting the linearity.

Divider 84 divides the result $$\left( bC_T + \frac{\sum_{k=1}^{n} a_n \times c_n}{\sum_{k=1}^{n} a_n} \right)$$

of adder 83 by weighted value b+1 for normalization so that a new track center value C is obtained as shown in Equation 1:

$$C = \frac{bC_T + \frac{\sum_{k=1}^{n} a_n x c_n}{\sum_{k=1}^{n} a_n}}{b+1}$$

$$\sum_{k=1}^{n} a_n \neq 0$$

and b≠0.

(2) A new track center value C is obtained by multiplying track center value for each block $C_1$ to $C_n$ without using one-track center value $C_T$. A new track center value C is found as shown in Equation 2:

$$C = \frac{\sum_{k=1}^{n} a_n x c_n}{\sum_{k=1}^{n} a_n}$$

wherein $$\sum_{k=1}^{n} a_n \neq 0.$$

Weighted values $a_1$ to $a_n$, multiplied to track center value $C_1$ to $C_n$ for each block, are varied according to the block in which much weight is given when dividing the track into n minute blocks. Divider 82 divides its result by a value $$\sum_{k=1}^{n} a_n$$

to which each weighted value is added for normalization, $$\frac{\sum_{k=1}^{n} a_n x c_n}{\sum_{k=1}^{n} a_n},$$

thus finding a new track center value C. Similarly, the value $$\sum_{k=1}^{n} a_n,$$

divided by divider 82, may be set as a given constant not zero. According to this method, the accuracy is a little decreased but its circuit may be simplified.

Figure 11:
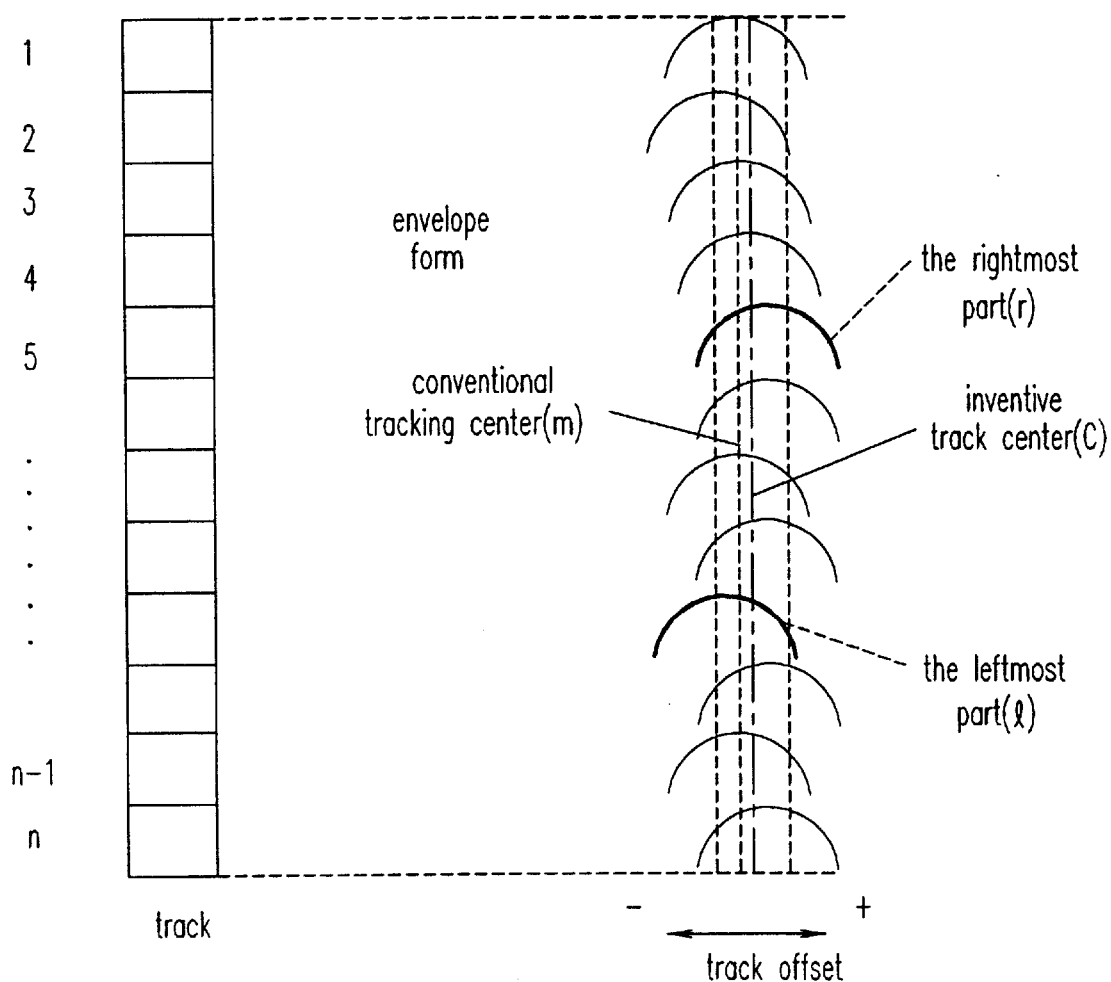
FIG. 11 depicts the form of an envelope with a track offset for each block.

(3) If an envelope with respect to a track offset for each block is that as shown in FIG. 11 when dividing a track into n blocks, the leftmost one 1 and the rightmost one r of n track center values $C_1$ to $C_n$ that are each produced from n blocks are added and divided by two, thus obtaining a new track center value C, as shown in Equation 3:

$$C = \frac{\text{Max}(c_n) + \text{Min}(c_n)}{2}$$

That is, a mean of the leftmost track center value and the rightmost track center value becomes a new track center value C.

Figure 12A:
FIGS. 12a to 12e depict the process solving the conventional problem according to the tracking method of the present invention.
Figure 12B:
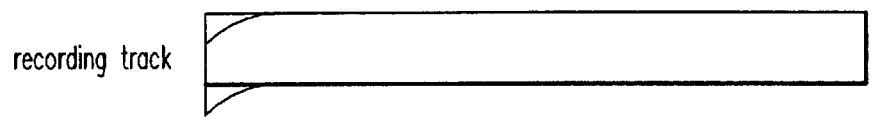
Figure 12C:
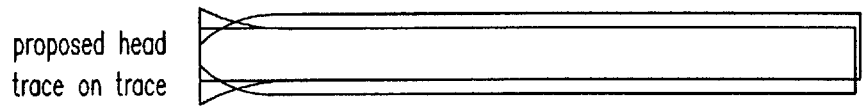

Referring to FIG. 11, a conventional tracking point m differs from a new tracking point C. Therefore, the trace of the track in set A due to the mechanical problems, worn-out tapes, etc. shows the state of recording with upwardly poor linearity, as shown in FIG. 12*a*, and the trace of the head in set B shows the state of downward poor linearity, as shown in FIG. 12*b*. The trace of the head on the track does not totally overlap the record track, as shown in FIG. 12*c*. Since an output of the head is shown in FIG. 12*e*, there is no area which cannot be restored. That is, the output exceeds the minimum signal levels that can be restored, thus making it possible to restore all the signals.

Figure 12D:
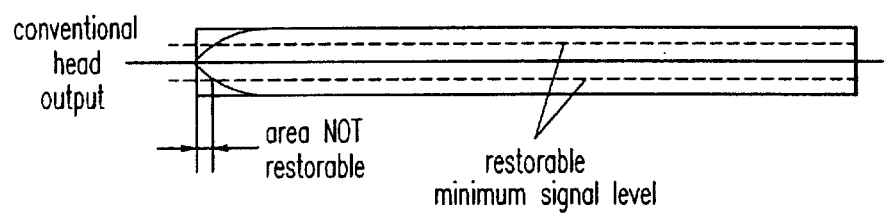
Figure 12E:
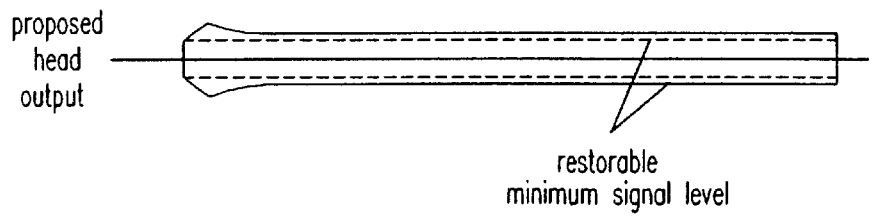

FIG. 12*d* depicts an output of the head according to a conventional method, for comparison.

SECOND PREFERRED EMBODIMENT

Figure 13:
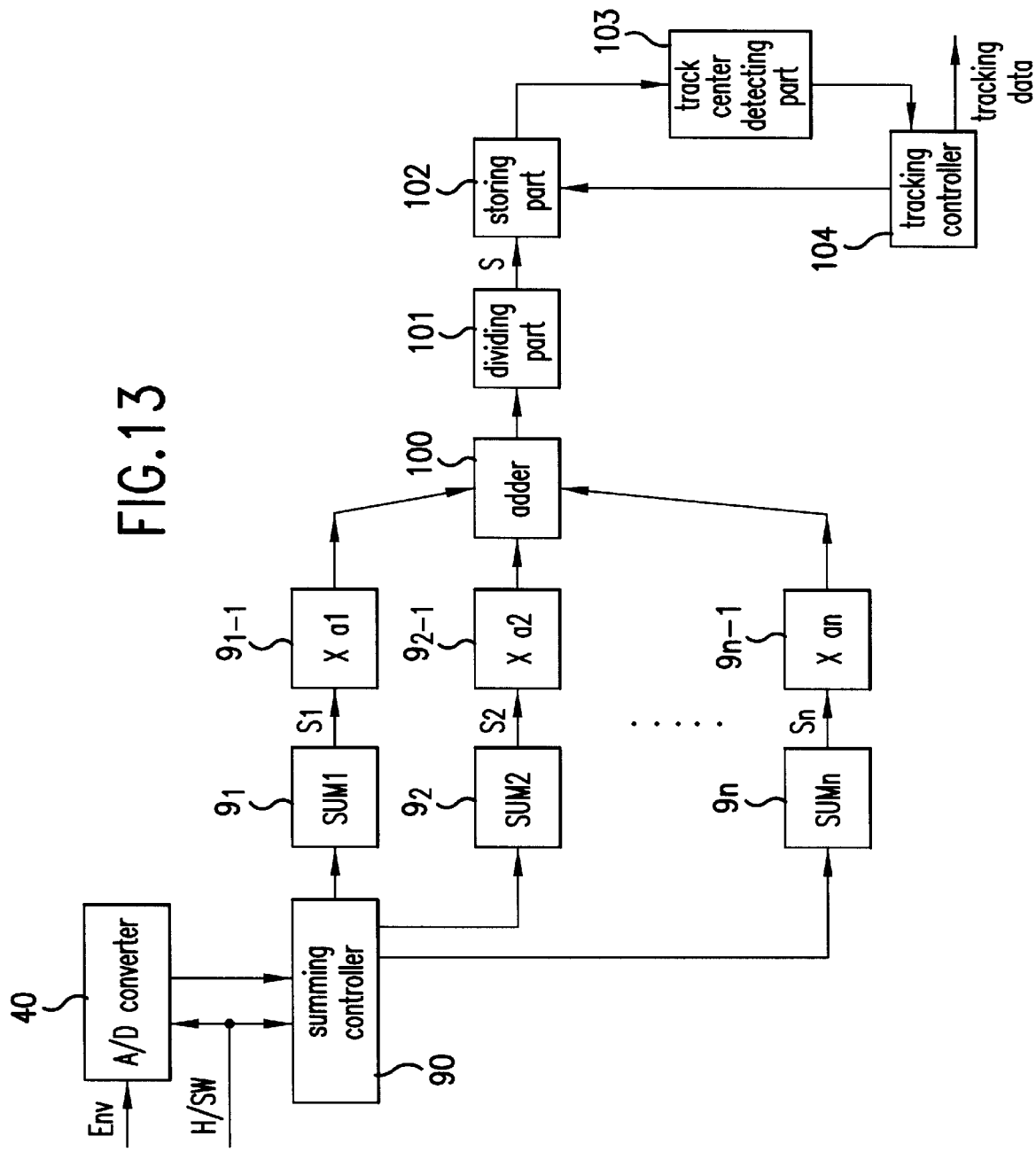
FIG. 13 is a block diagram of an automatic tracking system in accordance with a second preferred embodiment of the present invention.

FIG. 13 is a block diagram of an automatic tracking system in accordance with a second preferred embodiment of the present invention. A track is divided into n minute blocks, and values for each block are multiplied by corresponding weighted values and added, thus finding track center values.

A/D converter 40 samples and digitalizes an applied envelope signal with A/D clock. Summing controller 90 divides the track into n blocks by head switching pulse H/SW, and distributes digital data of A/D converter 40, corresponding to each block, to respective summing portions $9_1$ to $9_n$ of n blocks for summing. Each weighted value $a_1$ to $a_n$ is multiplied to sum data $S_1$ to $S_n$ of each summing portions $9_1$ to $9_n$ of n blocks in n multipliers $9_{1-1}$ to $9_{n-1}$, and results are produced to an adder 100. Adder 100 adds all the results of n multipliers $9_{1-1}$ to $$9_{n-1}\left(\sum_{k=1}^{n} a_n x s_n\right).$$

A divider 101 divides an output $$\sum_{k=1}^{n} a_n x s_n$$

of adder 100 by a value $$\sum_{k=1}^{n} a_n$$

to which each weighted value is added $$\frac{\sum_{k=1}^{n} a_n x s_n}{\sum_{k=1}^{n} a_n}$$

for normalization. Accordingly, a final sum value S from divider 101 is obtained by Equation 4:

$$S = \frac{\sum_{k=1}^{n} a_n x s_n}{\sum_{k=1}^{n} a_n}$$

wherein $$\sum_{k=1}^{n} a_n \neq 0.$$

Figure 14:
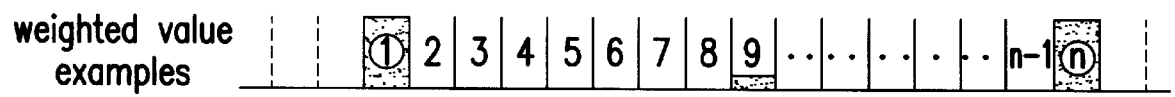
FIG. 14 is a timing diagram in which a track is divided into n blocks and a weighted value is applied to sum data for each block.

The value $$\sum_{k=1}^{n} a_n$$

divided by divider 101 is a given constant not zero. Weighted values $a_n$ to $a_n$ each multiplied to sum values $S_1$ to $S_n$ for each block are varied according to a block in which is given much weight, as shown in FIG. 14. The track center values of the blocks corresponding to the first and last parts of the track rather than the middle part are multiplied by a larger weighted value, thus correcting the linearity more accurately.

Storing part 102 stores sum data normalized by divider 101 in an address corresponding to an offset value produced from a tracking controller 104. Track center detecting part 103 finds a track center by using data for each track stored in storing part 102. There are well-known methods of finding a track center value, and the detailed description thereabout will be omitted. The track center value obtained by track center detecting part 103 is produced to tracking controller 104, and tracking controller 104 outputs the track center value to servo part 26, thus performing tracking.

According to the tracking system and tracking method of the present invention, first, one track center value is found by processing a track as a single block, and a track is divided into n minute blocks to obtain a track center value by each block. After that, a new track center value is found by using one track center value and a track center value for each block to perform tracking.

Second, a track is divided into n minute blocks to obtain a track center value for each block, and a new track center value is found by using the track center value for each block to perform tracking.

Third, a track is divided into n minute blocks to obtain a track center value for each block, and a mean of the leftmost value and the rightmost value of the track center values is set as a new track center value, thus performing tracking.

Fourth, a track is divided into n blocks, and sum data for each block is multiplied by a corresponding weighted value and added to find a track center value thereby performing tracking.

As described above, the present invention is capable of correcting a deterioration of the linearity of the track, thus enhancing the tracking effect, and prevents a degradation of the overall screen due to a level drop at a certain point in a digital VCR.

It will be apparent to those skilled in the art that various modifications and variations can be made in the automatic tracking system and the automatic tracking method of the present invention without departing from the spirit or scope of the invention. Thus, it is intended that the present invention cover the modifications and variations of this invention provided they come within the scope of the appended claims and their equivalents.

What is claimed is:

1. An automatic tracking system comprising:

an analog/digital converter for converting an envelope signal detected by scanning a track during reproduction into a digitized envelope signal;

a first track center detecting part for processing the entire track as a block and determining a track center value for the track using the digitized envelope signal;

a part track center detecting part for dividing the track into a plurality of minute blocks, summing digital data of the digitized envelope signal corresponding to each of the minute blocks to produce sum data for each minute block, and determining a track center value for each minute block using the sum data for each minute block;

a final track center detecting part for determining a new track center value by using the track center values output from the first track center detecting circuit and the part track center detecting part; and a tracking controller for producing an address corresponding to a track offset value when storing sum data in the first track center detecting part and the part track detecting part, and receiving the new track center value from the final track center detecting part and outputting said new track center value to a servo part for tracking.

2. An automatic tracking system according to claim 1, wherein the first track center detecting part includes:

a summing part for receiving and summing the digitized envelope signal output from the analog/digital converter by using a head switching pulse to produce the sum data for the entire track;

a storing part for storing the sum data produced from the summing part in an address corresponding to the track offset value output from the tracking controller; and a track center detecting part for determining the track center value for the track by using data for each track stored in the storing part.

3. An automatic tracking system according to claim 1, wherein the part track center detecting part includes:

a summing controller for dividing the track into a plurality of minute blocks and distributing digital data of the digitized envelope signal corresponding to the minute blocks to a plurality of sections; and the plurality of sections each for summing and storing digital data corresponding to one of the minute blocks and provided from the summing controller, and determining a track center value for each of the minute blocks based on the digital data.

4. An automatic tracking system according to claim 3, wherein each one of said sections includes:

summing means for summing said digital data distributed by the summing controller;

storing means for storing the sum data produced from the summing means in an address corresponding to the track offset value output from the tracking controller; and track center detecting means for finding a track center value for a corresponding minute block by the use of the sum data stored in the storing means.

5. An automatic tracking system according to claim 1, wherein the final track center detecting part multiplies a plurality of track center values $C_1$ to $C_n$ corresponding to the plurality of the minute blocks, by weighted values $a_1$ to $a_n$, respectively, and adds and divides its result by a value to produce a final track center value according to an equation:

$$\frac{\sum_{k=1}^{n} a_n x c_n}{\sum_{k=1}^{n} a_n},$$

wherein $$\sum_{k=1}^{n} a_n \neq 0.$$

6. An automatic tracking system according to claim 5, wherein the weighted values $a_1$ to $a_n$, multiplied to the track center values $C_1$ to $C_n$ of the respective blocks vary with the blocks.

7. An automatic tracking system according to claim 1, wherein the final track center detecting part divides a value $$\sum_{k=1}^{n} a_n x c_n,$$

obtained by multiplying the track center value for each minute block by each weight value and adding the multiplication results, by a given constant not equal to zero for normalization.

8. An automatic tracking system according to claim 1, wherein the final track center detecting part includes:
   a multiplier multiplying a track center value $C_T$ produced from the first track center detecting circuit by a weighted value b;
   a first track center detecting part multiplying a plurality of track center values $C_1$ to $C_n$, produced from the part track center detecting circuit, by the respective weighted values $a_1$ to $a_n$, and adding, and dividing its result by a value to which each weighted value is added $$\left(\frac{\sum_{k=1}^{n} a_n x c_n}{\sum_{k=1}^{n} a_n}\right);$$

an adder adding an output $b \times C_T$ of the multiplier to the output $$\frac{\sum_{k=1}^{n} a_n x c_n}{\sum_{k=1}^{n} a_n}$$

of the first track center detecting part; and a second track center detecting part dividing a result $$bC_T + \frac{\sum_{k=1}^{n} a_n x c_n}{\sum_{k=1}^{n} a_n}$$

of the adder by a weighted value b+1, thus finding a new track center value:

$$\frac{bC_T + \frac{\sum_{k=1}^{n} a_n x c_n}{\sum_{k=1}^{n} a_n}}{b+1},$$

wherein $$\sum_{k=1}^{n} a_n \neq 0$$

and b≠0.

9. An automatic tracking system according to claim 8, wherein the final track center detecting part divides the result $$bC_T + \frac{\sum_{k=1}^{n} a_n x c_n}{\sum_{k=1}^{n} a_n}$$

of the adder by a given constant not zero for normalization.

10. An automatic tracking system according to claim 1, wherein the final track center detecting part sets a final track center value as a mean of the leftmost value and the rightmost value of the track center values $C_1$ to $C_n$ produced from a plurality of the blocks of the part track center detecting circuit.

11. An automatic tracking system comprising:
   an analog/digital converter for converting an envelope signal detected by scanning a track during reproduction into a digitized envelope signal;
   a part track center detecting part for dividing the track into a plurality of minute blocks, summing digital data of the digitized envelope signal corresponding to the minute blocks to produce sum data for each minute block, and finding a track center value for each minute block using the sum data;
   a final track center detecting part for finding a new track center value by using the track center values output from the part track center detecting part; and
   a tracking controller for producing an address corresponding to a track offset value when storing the sum data in the part track center detecting part, receiving the new track center value from the final track center detecting part, and outputting said new track center value to a servo part for tracking.

12. An automatic tracking system according to claim 11, wherein the part track center detecting part includes:
   a summing controller for dividing track into the plurality of minute blocks, and distributing the digial data of the digitized envelope signal corresponding to the minute blocks to a plurality of sections; and the plurality of sections each for summing the corresponding digital data provided by the summing controller, storing said sum data, and finding a track center value for each of the minute blocks based on said sum data.

13. An automatic tracking system according to claim 12, wherein each of said sections corresponds to one of the minute blocks and includes:
   a summing part for summing the digital data distributed by the summing controller to produce the sum data for the corresponding minute block;
   a storing part for storing the sum data produced from the summing part in an address corresponding to the track offset value from the tracking controller; and
   track center detecting means for determining the track center value for the corresponding minute block by the use of the sum data stored in the storing part.

14. An automatic tracking system according to claim 11, wherein the final track center detecting part multiplies a plurality of track center values $C_1$ to $C_n$, corresponding to the plurality of the minute blocks, by weighted values $a_1$ to $a_n$, respectively, and adds and divides its result by a value to produce the final track center value in accordance with an equation:

$$\frac{\sum_{k=1}^{n} a_n x c_n}{\sum_{k=1}^{n} a_n},$$

wherein $$\sum_{k=1}^{n} a_n \neq 0.$$

15. An automatic tracking system according to claim 14, the weighted values $a_1$ to $a_n$, multiplied to the track center values $C_1$ to $C_n$ of the respective blocks vary with the blocks.

16. An automatic tracking system according to claim 11, wherein the final track center detecting part divides a value $$\sum_{k=1}^{n} a_n x c_n,$$

obtained by multiplying the track center value for each minute block by each weight value and adding the multiplication results, by a given constant not equal to zero for normalization.

17. An automatic tracking system according to claim 11, wherein the final track center detecting part sets a final track center value as a mean of the leftmost value and the rightmost value of the track center values $C_1$ to $C_n$ produced from a plurality of the blocks of the part track center detecting circuit.

18. An automatic tracking system comprising:
   an analog/digital converter converting an envelope signal detected during reproduction into a digital signal;
   a part track center detecting circuit dividing a track into a plurality of minute blocks, summing and storing digital data each corresponding to the minute blocks, distributed from the analog/digital converter, in each minute block, and finding a track center value for each minute block;
   a final track center detecting part determining a new track center value as a mean of the leftmost value and the rightmost value of track center values produced from a plurality of blocks of the part track center detecting circuit; and
   a tracking controller producing an address corresponding to a track offset value when storing sum data in the part track center detecting circuit, and receiving the final track center value from the final track center detecting part and producing said value to a servo part for tracking.

19. An automatic tracking system according to claim 18, wherein the part track center detecting circuit includes:
   a summing controller dividing a track into a plurality of minute blocks, and distributing the analog/digital converter's digital data for each block to the respective blocks; and
   a plurality of blocks summing and storing digital data provided through the summing controller and finding a track center value for each block.

20. An automatic tracking system according to claim 19, wherein each of said blocks includes:
   summing means summing digital data distributed by the summing controller;
   storing means storing sum data produced from the summing means in an address corresponding to the track offset value from the tracking controller; and
   track center detecting means finding a track center value for a corresponding block by the use of data stored in the storing means.

21. A method of performing automatic tracking by converting an envelope signal detected by scanning a track during reproduction into a digitized envelope signal, the method comprising:
   a first step of summing and storing the digitized envelope signal by processing the track as one block, and finding a track center value for the track;
   a second step of dividing the track into a plurality of minute blocks, summing the digitized envelope signal corresponding to each of the minute blocks to produce sum data for each minute block, and finding a track center value for each minute block using said sum data;
   a third step of finding a final track center value by using track center values output in the first and second steps; and
   a fourth step of producing an address corresponding to a track offset value when storing sum data in the first and second steps, and outputting the final track center value from the third step for tracking.

22. A method according to claim 21, wherein the first step includes the sub-steps of:
   receiving and summing the digitized envelope signal by using a head switching pulse to produce sum data for the track;
   storing this sum data in an address corresponding to the track offset value produced from the fourth step; and
   finding the track center value by using sum data for each track stored in said storing sub-step.

23. A method according to claim 21, wherein the second step includes the sub-steps of:
   dividing the track into the plurality of minute blocks and distributing portions of the digitized envelope signal corresponding to the minute blocks to a plurality of block-processing sections; and
   summing and storing, by each of the block-processing sections, said portions of the digitized envelope signal to find the track center value for each minute block.

24. A method according to claim 21, wherein, in the third step, a plurality of track center values $C_1$ to $C_n$ corresponding to the plurality of the minute blocks in the second step are multiplied by weighted values $a_1$ to $a_n$, respectively, and are added and then divided by a value to produce the final track center value in accordance with an equation:

$$\frac{\sum_{k=1}^{n} a_n x c_n}{\sum_{k=1}^{n} a_n},$$

wherein $$\sum_{k=1}^{n} a_n \neq 0.$$

25. A method according to claim 24, wherein the weighted values $a_1$ to $a_n$, multiplied to the track center values $C_1$ to $C_n$ of the respective blocks vary with the blocks.

26. A method according to claim 21, wherein, in the third step, a value $$\sum_{k=1}^{n} a_n x c_n,$$

obtained by multiplying the track center value for each of the minute blocks by each weight value and adding the multiplication results, is divided by a given constant not equal to zero for normalization.

27. A method according to claim 21, wherein the third step includes:

a first sub-step of multiplying a track center value $C_T$ produced from the first step by a weighted value b ($b \times C_T$);

a second sub-step of multiplying a plurality of track center values $C_1$ to $C_n$, produced from the second step, by the respective weighted values $a_1$ to $a_n$, and adding, and dividing its result by a value to which each weighted value is added $$\left( \frac{\sum_{k=1}^{n} a_n x c_n}{\sum_{k=1}^{n} a_n} \right);$$

a third sub-step of adding an output $b \times C_T$ of the first sub-step to the output $$\frac{\sum_{k=1}^{n} a_n x c_n}{\sum_{k=1}^{n} a_n}$$

of the second sub-step; and a fourth sub-step of dividing a result $$\left( bC_T + \frac{\sum_{k=1}^{n} a_n x c_n}{\sum_{k=1}^{n} a_n} \right)$$

of the third sub-step by a weighted value b+1, thus finding a new track center value $$\frac{bC_T + \frac{\sum_{k=1}^{n} a_n x c_n}{\sum_{k=1}^{n} a_n}}{b+1},$$

wherein $$\sum_{k=1}^{n} a_n \neq 0$$

and $b \neq 0$.

28. A method according to claim 27, wherein in the third step the result $$bC_T + \frac{\sum_{k=1}^{n} a_n x c_n}{\sum_{k=1}^{n} a_n}$$

of the third step is divided by a given constant not zero for normalization.

29. A method according to claim 21, wherein the third step sets a final track center value as a mean of the leftmost value and the rightmost value of the track center values $C_1$ to $C_n$ produced from a plurality of the blocks of the second step.

30. A method of performing automatic tracking by converting an envelope signal detected by scanning a track during reproduction into a digitized envelope signal, the method comprising:

a first step of dividing the track into a plurality of minute blocks, summing the digitized envelope signal corresponding to each of the minute blocks, and finding a track center value for each minute block using the summation results;

a second step of finding a final track center value by using the track center values output in the first step; and a third step of producing an address corresponding to a track offset value when storing the summation results in the first step, and outputting the final track center value from the second step for tracking.

31. A method according to claim 30, wherein, in the second step, a plurality of track center values $C_1$ to $C_n$ corresponding to the plurality of the minute blocks are multiplied by weighted values $a_1$ to $a_n$, respectively, and are added and then divided by a value to produce the final track center value according to an equation:

$$\frac{\sum_{k=1}^{n} a_n x c_n}{\sum_{k=1}^{n} a_n},$$

wherein $$\sum_{k=1}^{n} a_n \neq 0.$$

32. A method according to claim 31, wherein the weighted values $a_1$ to $a_n$, multiplied to the track center values $C_1$ to $C_n$ of the respective blocks vary with the blocks.

33. A method according to claim 30, wherein, in the second step, a value $$\sum_{k=1}^{n} a_n x c_n,$$

obtained by multiplying the track center value for each minute block by each weight value and adding the multiplication results, is divided by a given constant not equal to zero for normalization.

34. A method of performing automatic tracking by converting an envelope signal, detected during reproduction, into a digital signal, comprising:

a first step of dividing the track into a plurality of minute blocks, summing and storing the digital envelope signal corresponding to each block in each block, and finding a track center value for each minute block;

a second step of setting as a new track center value a mean of the leftmost value and rightmost value of track center values output from a plurality of the blocks in the first step; and a third step of producing an address corresponding to a track offset value when storing sum data in the first step, and receiving a final track center value from the second step for tracking.

* * * * *